Figure 6:
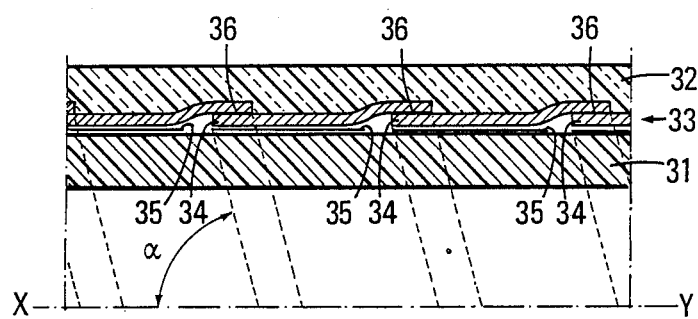

United States Patent [19]

Delacour et al.

[11] Patent Number: 4,903,735

[45] Date of Patent: Feb. 27, 1990

[54] PIPE USABLE PARTICULARLY FOR TRANSPORTING FLUIDS AND ALLOWING THE PERMEABILITY TO THE FLUIDS TRANSPORTED TO BE LIMITED

[75] Inventors: Jacques Delacour, Paris; Jacques Jarrin, Rueil-Malmaison; Bernard Dewimille, Grigny; Francois Dawans, Bougival, all of France

[73] Assignee: Institut Francais du Petrole, Rueil Malmaison, France

[21] Appl. No.: 26,757

[22] PCT Filed: Jun. 6, 1986

[86] PCT No.: PCT/FR86/00194

§ 371 Date: Apr. 8, 1987

§ 102(e) Date: Apr. 8, 1987

[87] PCT Pub. No.: WO86/07432

PCT Pub. Date: Dec. 18, 1986

[30] Foreign Application Priority Data

Jun. 11, 1985 [FR] France .................. 85 08938
Sep. 20, 1985 [FR] France .................. 85 14019

[51] Int. Cl.⁴ .......................................... F16L 11/00
[52] U.S. Cl. ................................. 138/133; 138/141; 138/143; 138/144
[58] Field of Search ............ 138/122, 130, 131, 133, 138/123, 129, 134, 135, 138, 141, 143, 144

[56] References Cited

U.S. PATENT DOCUMENTS 3,604,461 9/1971 Matthews .......................... 138/130
4,403,631 9/1983 Abdullaev et al. ................. 138/133

Primary Examiner—Henry J. Recla
Assistant Examiner—Glenn T. Barrett
Attorney, Agent, or Firm—Antonelli, Terry & Wands

[57] ABSTRACT

Disclosed is a rigid or flexible conduit usable particularly for transporting fluids and enabling to limit the permeability to transported fluids. According to the invention, the conduit comprises at least an inner flexible sheath (1) made of thermoplastic, elastic, or rubber material and an outer sheath (10) comprising a metal layer (3) and arranged around said inner sheath (1). Said metal layer comprises at least a layer of flat metal band (3) which is spirally wound with a winding angle α higher than 50° and lower than 90° with respect to the axes of the conduit. For rigid conduits, said metal layer (3) is adhered to said inner flexible sheath (1) on the major part of the width of the band (3). For flexible conduits, the turns present superposition areas so as to provide for a complete covering of said inner sheath (1), the superposition areas (30) of the band turns on one hand and the areas comprised between said superposition areas on the other hand, having each a width at least equal to amplitude of the deformation imposed to the outer sheath by the maximum bending or traction of the conduit. Application particularly to the transportion of corrosive fluids under pressure, to the oil industry at the drilling site or the production.

19 Claims, 2 Drawing Sheets

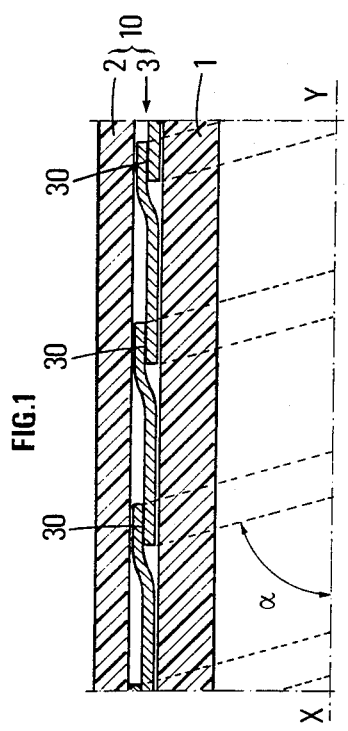
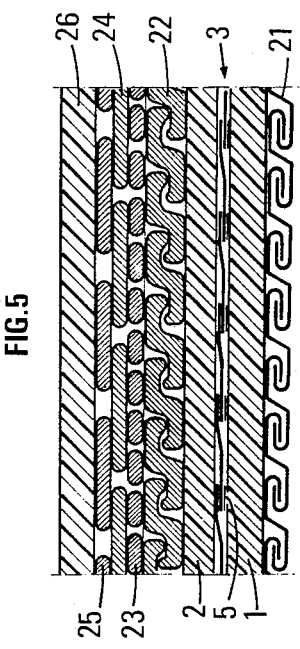
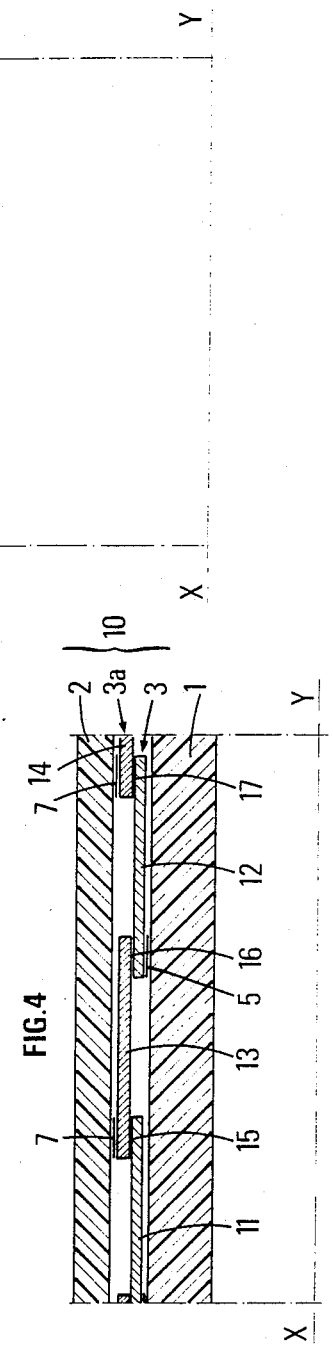
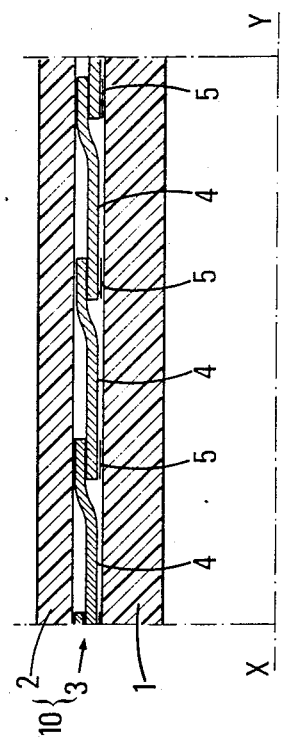
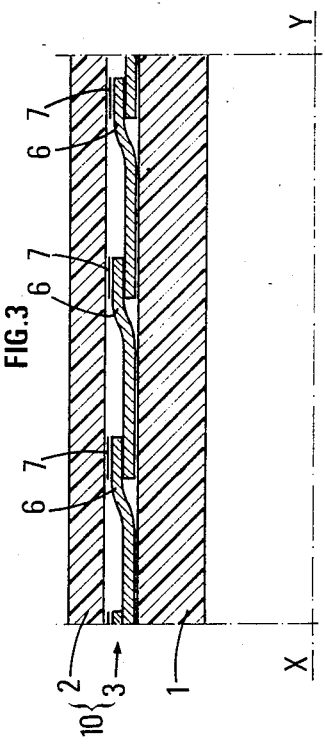

PIPE USABLE PARTICULARLY FOR TRANSPORTING FLUIDS AND ALLOWING THE PERMEABILITY TO THE FLUIDS TRANSPORTED TO BE LIMITED

The present invention relates to a pipe usable in particular for transporting fluids and allowing the permeability to the fluids transported, for example corrosive fluids, to be limited.

The invention relates in particular to the field of transporting liquid or gaseous fluids, particularly hydrocarbons, in pipes likely to be used at high pressure and high temperatures for long periods of time.

The application of the invention to the production of flexible pipes and rigid reinforced-resin pipes will be considered in particular below.

Here, flexible tubes or pipes are understood to be pipes having sufficient flexibility to accept (without deterioration) a radius of curvature R less than or equal to $a \times d$, wherein d is the diameter of the tube measured in the same unit as R and a is a numerical coefficient whose value does not exceed a few units, 4 to 5 for example.

A flexible pipe designed to operate under high pressure is composed for example of the following elements:
 a folded metal strip designed to prevent the pipe from being crushed by the pressure differential between the inside and the outside;
 a flexible inner sheath made of plastic or elastomer, making the pipe largely impermeable on the inside;
 at least one reinforcing layer to withstand tensile and/or internal pressure forces, and
 a second flexible plastic or elastomer sheath to ensure external impermeability of the pipe.

A rigid pipe designed to operate under high pressure is composed for example of the following elements:
 a soft, inner, highly flexible sheath
 an outer sheath formed by winding fibers pre-impregnated with a thermosetting resin.

The problems involved in transportation of liquid or gaseous fluids at high temperatures and pressures in these types of pipes are linked to the permeability of the products used.

For flexible pipes, these problems are (1) permeability of the material of which the inner sealing sheath is composed, whereby this permeability increases very substantially with temperature and pressure, and (2) accumulation of gas between the inner and outer sheaths due to the fact that the permeability of the outer sheath may be far less than that of the inner sheath.

Particularly in the case of transporting liquid or gaseous hydrocarbons likely to contain corrosive agents such as $H_2S$, $CO_2$, etc., this accumulation may cause accelerated corrosion of the metal reinforcements.

In addition, the pressure prevailing between the two sealing layers may become greater than the external pressure applied to the flexible pipe and cause the outer sheath to shatter.

Moreover, these permeability phenomena result in varying degrees of loss of transported fluid.

For rigid pipes, these problems are due to the limited flexibility of the pipes which causes microcracking under mechanical stress, which can lead to "sweating" of the fluid.

It is known that the use of continuous corrugated metal in a flexible pipe instead of the plastic inner sheath avoids the drawbacks inherent in plastic sheaths, but this solution has the drawback of great sensitivity to corrosion, the corrugated metal being in direct contact with the fluid. Moreover, the geometry of the metal can disturb the flow of the fluids or passage of any special tools (measuring or cleaning tools for example) through the pipe.

European patent application EP-A-0.111.169 relates to a multi-layer gastight tube. It has in particular a metal envelope integral with the outer periphery of a plastic sheath and with the inner periphery of an outer tube. The integral assembly is spiral-wound edge to edge, either hot such as to form a seal with the plastic sheath which has been softened, or by means of a cold-setting or hot-setting cement. This edge-to-edge winding technique of layers which are integral with each other can only be applied to rigid tubes and not to flexible tubes which would then lose all their flexibility.

The prior art of pipe-making techniques is illustrated for example by patents FR-A-2.467.347 or EP-A-0.068.128.

When applied to flexible tubes, the present invention allows the permeability of the flexible sheaths to be limited without altering the internal geometry of the tube and without reducing the flexibility of the pipe. It relates to a pipe usable in particular for transporting fluid, possibly under pressure, allowing the permeability to the fluids transported to be limited, comprising an inner flexible sheath made of a thermoplastic material or elastomer, and an outer sheath having a metal layer and being disposed around said inner sheath, characterized by said metal layer having at least one flat metal band layer wound spirally at a winding angle $\alpha$ greater than 50° and less than 90° to the pipe axis, the turns of this band having overlap zones such as to ensure full wrapping of said inner sheath, the overlap zones of the band and the zones between said overlap zones each having a width at least equal to the degree of deformation imposed on the outer sheath by the maximum stretching or bending of the pipe.

One of the essential advantages of the wrap so provided according to the invention is contact of the metal layers under the effect of pressure of the fluids on the inner sheath, which reinforces the impermeability of the flexible pipe while keeping its flexibility intact because play exists between the turns.

The metal layer may have a metal band layer cemented to said inner sheath over a part of the width of this layer in contact with said inner sheath, so that there is free play between the turns of the metal band, conferring great freedom of movement on the turns when the flexible pipe is test-coiled or uncoiled.

It may also be advantageous, according to another embodiment, for the metal layer to have a metal band layer cemented to an outer envelope over part of the width of said layer in contact with said outer envelope, with the turns of the metal band being able to have free play with respect to each other.

The cementing as described may make it possible to avoid the changing of the winding pitch that may result from deformation of the pipe when it is handled for storage and/or service. Also, cementing can be performed continuously or discontinuously, but better results have been obtained when cementing was continuous over a part of the band in contact with one or the other of the flexible sheaths.

Advantageously, the band can be cemented to the edge in contact with said inner sheath or with the outer envelope, to avoid relative movements of this edge in contact with the sheath or envelope and decrease the risk of chipping of the sheath or envelope by this edge in contact with fluid on the inside or outside.

The metal layer according to the invention can be cemented with a cold-setting or hot-setting cement or hot-melting glue depending on the situation or the type of material. An adhesion primer may also be applied to the sheath and/or band.

According to another embodiment, the pipe may have at least two superimposed layers of metal band, the layer of band in contact with the inner sheath being cemented to the sheath over part of the width of the metal band and the layer in contact with the outer sheath being cemented thereto over part of the width of the metal band.

The objective of the present invention applied to rigid pipes is achieved by winding, between the flexible inner sheath and the outer sheath formed by winding fibers pre-impregnated with a thermosetting resin, at least one layer of flat metal band which is cemented to the inner sheath over at least the majority of the width of the band.

This band is spirally wound at a winding angle $\alpha$ greater than 50° and less than 90° to the pipe axis, the turns of this band having overlap zones such as to ensure a full wrap of said inner sheath, both the overlap zones of the turns of the band and the zones between said overlap zones each having a width at least equal to the degree of deformation imposed on said sheaths by maximum stretching or bending of the pipe or by decompression.

The overlap zones are not cemented. However, if it is preferred to cement them to improve their impermeability, a flexible cement of the neoprene type able to accept the deformation imposed will preferably be selected.

Cementing as described may allow a virtually gas-tight pipe with a constant cross section to be obtained and prevent changes in the winding pitch that might result from deformations of the pipe when handled for storage and/or in service.

Both for rigid pipes and for flexible pipes, one may preferably use bands made of amorphous metal strips or amorphous metal alloys as described in French Patents FR-A-2.368.324 and FR-A-2.381.581 due to their mechanical properties being superior to those of the corresponding crystalline metals or alloys, in particular their strength and hardness characteristics (up to 370 kg/mm$^2$ and 1100 kg/mm$^2$ respectively) and their high elastic limit. These amorphous metals are usually used for their isotropic mechanical strengths and other isotropic physical properties such as magnetizability.

Since the fluids to be transported are corrosive, it is preferable to use, especially when the fluids contain hydrosulfuric acid, corrosion-resistant metals such as alloys whose composition includes, in particular, chromium and/or nickel and/or cobalt and/or molybdenum.

Bands of amorphous metals with a composition which includes, in particular, iron, chromium, phosphorus, carbon, and possibly nickel, cobalt, or molybdenum, alone or in a mixture, with an atomic percentage of metalloids (P, C, B, etc.) preferably equal to 20% at most, have given excellent results in terms of gas-tightness and corrosion resistance. The width of the bands will preferably be equal to at least 1 cm and its thickness may vary from 1/100 mm to a few tenths of a millimeter, preferably 5/100 mm to 5/10 mm.

All extrudable thermoplastics or elastomers may be used, with wall thicknesses varying according to each loading case. For example, one may use polyamides, polyolefins, or fluorinated polymers (PVDF) as the thermoplastics, and synthetic or natural elastomers.

When the pipe has several sheaths made of a thermoplastic or elastomer material such as an outer sheath and an inner sheath, the material of one sheath may be different from that of the other.

Figure 7:
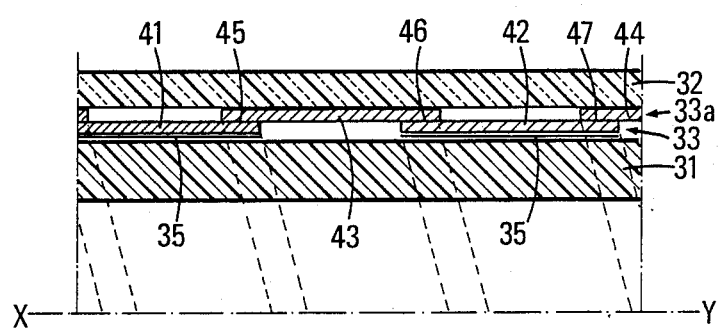
Figure 8:
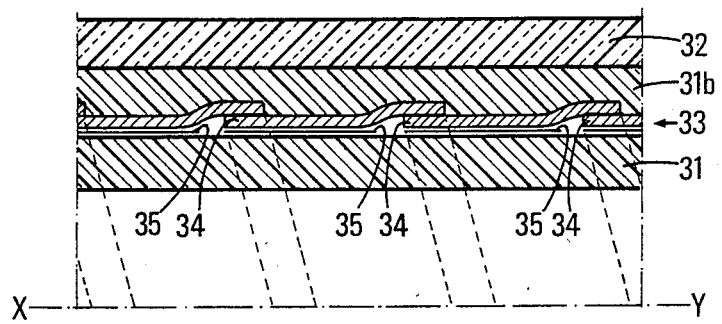

The invention will be better understood with reference to the attached figures below showing examples of embodiments:

FIGS. 1, 2, and 3 represent a flexible pipe according to the invention in lengthwise section, FIG. 4 shows another embodiment of a flexible pipe according to the invention in lengthwise section, FIG. 5 illustrates a preferred embodiment according to the invention in the case of a high-pressure flexible pipe (the thicknesses of the various layers are not shown to the same scale), FIG. 6 shows a rigid pipe according to the invention in lengthwise section, FIG. 7 shows an embodiment of a rigid pipe according to the invention in lengthwise section, and FIG. 8 illustrates another embodiment of a rigid pipe in lengthwise section designed for high performance.

In FIGS. 1 to 5, where X-Y is the lengthwise axis of flexible pipe 10, a thermoplastic or elastomer inner tube or sheath 1 has been extruded and, according to the invention, a metal band 3 has been wound with sufficient tension to press it against inner sheath 1. The band has been wound helically at an angle $\alpha$ greater than 50° and less than 90° to the axis of the pipe, and with overlap zones (30, FIG. 1; 15, 16, and 17, FIG. 4) whose width is at least equal to the degree of deformation (elongation or shortening) imposed on outer sheath 10 during storage and/or in service 10, said sheath possibly having an outer envelope 2 and a metal layer 3. This outer sheath 10 has been extruded over the metal layer according to the invention and is applied to its outer part.

According to FIG. 2, this band 3 may be cemented to a part of the width which is in contact 4, namely the edge in contact 5 with said inner sheath 1 of the flexible pipe.

According to FIG. 3, the band can be cemented to a part in contact 6, namely to the edge in contact 7 with outer envelope 2 of the flexible pipe.

FIG. 4 shows another embodiment of the flexible pipe according to the invention where there has been wound on inner sheath 1 a first layer of band 3 whose turns 11 and 12 do not overlap and a second layer 3a with turns 13 and 14 covering the former turns and resting against the facing edges 15, 16, and 17 of turns 11 and 12 of layer 3.

The turns of layer 3 are cemented at 5 to inner sheath 1 and the turns of layer 3a are cemented at 7 to outer envelope 2.

In the preferred embodiment showing a flexible pipe under pressure (FIG. 5), an inner sheath 1 4 mm thick made of Rilsan 11 (registered trademark) has been extruded over a strip 21 with an outer diameter of 100 mm, made of stainless steel.

A thin film of hot-melting glue compatible with Rilsan 11, 3 mm wide, is applied to the inner sheath at a spiral-winding angle equal to that used for winding the band, i.e. about 84° corresponding to a pitch of 24 mm.

Band 3 made of an alloy of amorphous metals, preheated to a temperature substantially higher than the softening point of the glue, is spiral-wound by a known technique at a winding tension of 200 Newtons.

The width of the overlap zones of the adjacent turns represents about 20% of the width of these turns, i.e. 6 mm in the example considered, and the band is applied such that only edge 5 of the band is cemented to inner sheath 1.

The amorphous-metal alloy band had the following characteristics, able in particular to ensure good corrosion resistance:

Composition: $Fe_{72}Cr_8P_{13}C_7$
Width: 3 cm
Thickness: 20/100 mm.

A flexible outer envelope 2 made of of medium-density polyethylene 2 mm thick was then extruded by a known technique, which covers metal layer 3 according to the invention.

Various wraps have been wound over envelope 2:
an S-shaped wrap 22 known as "zeta" and another wrap 23 8 mm thick, both wound helically at angles of approximately 85° and pressure-resistant,
an armature ply 24 and an armature ply 25 with a coarse pitch, 3 mm thick, with high tensile strength and spiral-wound, one laid right and the other laid left at an angle of 35° to the axis of the flexible pipe.
finally, a last outer sheath 26.

Under these conditions, a flexible pipe is obtained whose flexibility remains intact and for which the permeability to methane for example of layers 1, 2, 3 is reduced by a factor of about 50 to 100 depending on the utilization conditions, by comparison to a single plastic layer with impermeability.

It will not be beyond the scope of the invention for example to interpose a layer of grease such as a layer of grease based on silicones insoluble in hydrocarbons and heat-stable, between metal band 3 and sheath 1 and/or envelope 2 on the one hand and/or between the contact or overlap zones 30 (FIG. 1) and 15, 16, and 17 (FIG. 4) of one turn of the band with the next, on the other hand.

In FIG. 6, where XY represents the axis of the pipe, a flat layer of metal band 33 is wound and cemented 35 with a sufficient tension around a soft, flexible inner sheath 31 made of thermoplastic material or elastomer which is hence supported by the inner face of the band. The cement has been deposited on the largest surface in contact between sheath 31 and layer 33.

The band is composed of a winding of turns 34 at an angle $\alpha$ greater than 50° and less than 90° to axis XY. Turns 34 of said band 33 have overlap zones 36 in order to accept any deformations upon decompression of the pipe and to ensure total wrapping of inner sheath 31. Overlap zones 36 of turns 34 of the band and the zones between the overlap zones both have a width at least equal to the degree of deformation (decompression, elongation, or shortening) imposed on sheaths 32 of the pipe.

The impermeability to the gases in the pipe is thus substantially improved. To maintain greater stiffness, the pipe comprising sheath 31 and band 33 is surrounded with an outer sheath 32 made of a composite material wound at an angle less than 90° to the axis of the pipe according to a technique known to the individual skilled in the art.

The composite materials used can be for example glass, carbon, or Kevlar (registered trademark) fibers impregnated with resin, for example epoxy, or composites based on strip steel.

When cold the resin will crosslink and adhere to the metal layer which will have been pre-degreased. This type of pipe will be particularly advantageous for low and medium performance.

FIG. 7 illustrates another embodiment of a rigid pipe where a first layer of band 33 whose turns 41 and 42 do not overlap and a second layer 33a whose turns 43 and 44 overlap the previous turns, pressing against facing edges 45, 44, 47 of turns 41 and 42 of layer 33, is wound on inner sheath 31.

The turns of layer 33 are cemented at 35 to at least the major part of the width in contact with the inner sheath and preferably to the entire width of the turns. One winding of an outer sheath 32 made of composite material, as above, stiffens the pipe thus formed by adhering to metal layers 33 and 33a.

FIG. 8 shows another embodiment of a high-performance rigid pipe where inner sheath 31 is cemented 35 and thus supported by metal layer 33 made of turns 34.

Over this metal layer another thermoplastic or elastomer sheath 31b has been extruded, which sheath presses against and adheres to this layer 33 which is hence applied against this soft sheath composed of sheaths 31 and 31b. Sheath 31 thus stiffened and substantially gastight is then surrounded by at least one outer sheath 32 made of a composite material as described above.

The rigid pipe in its preferred embodiment (FIG. 7), in order to withstand high pressures on the order of 300 bars and high temperatures, has an inner sheath 2 mm thick made of Rilsan 11 (registered trademark), 15 cm in diameter. A thin film of hot-melting cement compatible with the Rilsan 11, 20 cm thick, is applied to the inner sheath at a spiral-winding angle equal to that used for winding the band, i.e. approximately 84°.

Band 33 made of amorphous metals preheated to a temperature substantially higher than the softening point of the cement is spiral-wound by a known technique at a winding tension of 200 Newtons.

The band of amorphous-metal alloy has the following characteristics, capable in particular of ensuring good corrosion resistance:

Composition: $Fe_{72}Cr_8P_{13}C_7$
Width: 3 cm
Thickness: 20/100 mm.

The width of the overlap zones of adjacent turns represents approximately 20% of the width of these turns, or 6 mm in the example considered, and the band is placed such that the major part of the width of the turns of band 33 is cemented to inner sheath 31.

After degreasing the upper part of band 33, a plastic Rilsan 11 sheath 1 mm thick is extruded by a known techique, levelling layer 33 and finally, over this sheath 31b, at least one layer of composite fibers as described is wound at winding angles known to the individual skilled in the art and compatible with the tensile and compressive forces the pipe must withstand.

Under these conditions, a rigid pipe is obtained wherein the permeability of inner sheath 31 to methane for example is reduced by a factor of about 50 to 100 depending on the utilization conditions.

The invention is not of coursed limited to the embodiments described as examples.

The pipes according to the invention described above can serve in particular as means of transporting corrosive fluid hydrocarbons at fairly high pressures and temperatures. These pipes can also be used for drilling and hydrocarbon production operations which require high dynamic stresses, and metal layer 3, 33 could be used to carry electrical information underground-to-surface and surface-to-underground.

The rigid pipes can in particular be used as risers in drilling and hydrocarbon production.

We claim:

1. A pipe useful for transporting fluids which may be under pressure having limited permeability to fluids transported therein, said pipe comprising a flexible inner sheath made of a thermoplastic material or elastomer, an outer sheath comprised of an outer envelope of a flexible polymeric material and a metal layer disposed around said inner sheath, said metal layer comprising at least one layer of flexible, thin and flat metal band wound spirally at a winding angle $\alpha$ greater than 50° and less than 90° to an axis of the pipe, turns of said at least one layer of a flexible, thin and flat metal band having overlapping zones to ensure total wrapping of said inner sheath, said overlapping zones being provided by consecutive turns of the at least one layer of a flexible, thin and flat metal band, the overlapping zones of the turns and zones between said overlapping zones both having widths at least equal to a degree of deformation imposed on the outer sheath by maximum stretching and bending of the pipe; said metal layer being cemented to at least one of the inner sheath and the outer envelope.

2. A pipe according to claim 1, wherein the flexible, thin and flat metal band is made of an amorphous metal or an amorphous metal alloy.

3. A pipe according to claim 2, wherein the flexible, thin and flat metal band has a composition containing iron, chromium, phosphorus, carbon and a metal selected from the group consisting of cobalt, molybdenum and nickel, with an atomic percentage of metaloids equal to at most 20%.

4. A pipe according to claim 2, wherein the flexible, thin and flat metal band has a composition containing iron, chromium, phosphorus and carbon with an atomic percentage of metaloids equal to at most 20%.

5. A pipe according to claim 1, wherein the outer envelope of the sheath is flexible and the flexible, thin and flat metal band is made of an amorphous metal or an amorphous metal alloy.

6. A pipe according to claim 1, wherein said metal layer comprises a layer of a flexible, thin and flat metal band cemented to said inner sheath, over a part of the width of said metal band in contact with said inner sheath, the turns of the metal band having free play with respect to each other.

7. A pipe according to claim 6, wherein the flat metal band is cemented to said inner sheath substantially at a level of an edge of the flat metal band in contact with said inner sheath.

8. A pipe according to claim 1, wherein said metal layer comprises a layer of a flexible, thin and flat metal band cemented to the outer envelope of a flexible polymeric material over a part of the width of the metal band in contact with said outer envelope, the turns of the metal band having free play with respect to each other.

9. A pipe according to claim 8, wherein the flat metal band is cemented to said outer envelope substantially at a level of an edge of the metal band in contact with said outer envelope.

10. A pipe according to claim 8, wherein a layer of grease is only substantially interposed between said outer envelope and said at least one layer of a flexible, thin and flat metal band.

11. A pipe according to claim 1, wherein the flexible, thin and flat metal band has a composition containing chromium and at least one metal selected from the group consisting of cobalt, nickel and molybdenum.

12. A pipe according to claim 1, wherein a layer of grease is only substantially interposed between said inner sheath and said at least one layer of a flexible, thin and flat metal band.

13. A pipe according to claim 1, wherein a layer of grease is interposed between turns of the at least one layer of a flexible, thin and flat metal band in the overlapping zones.

14. A pipe according to claim 1, wherein said metal layer comprises at least two overlapping layers of flexible, thin and flat metal bands, a layer of one flexible, thin and flat metal band being in contact with the inner sheath and being cemented thereto over a part of the width of the one flexible, thin and flat metal band, and a layer of another flexible, thin and metal band being in contact with the outer envelope and being cemented thereto over a part of the width of the another flexible, thin and flat metal band; said two layers of the flexible, thin and flat metal bands having free play with respect to each other.

15. A pipe according to claim 1, wherein said outer envelope comprises a composite material containing a reinforcing fiber strip impregnated with a resin, and the at least one metal layer of a flexible, thin and flat metal band is cemented to said inner flexible sheath over at least the majority of the width of the metal band.

16. A pipe according to claim 15, further comprising a flexible sheath of polymeric material extruded over said metal layer of the flexible, thin and flat metal band and arranged beneath said outer envelope.

17. A pipe according to claim 15, wherein said metal layer comprises a layer of a flexible, thin and flat metal band adhering to the outer envelope over at least a part of the width of the metal layer in contact with said outer envelope.

18. A pipe according to claim 1, wherein said at least one layer of a flexible, thin and flat metal band wound spirally at said winding angle is cemented to said inner sheath or to the outer envelope over a width of said metal band in contact with said inner sheath or with said outer envelope that varies from a width of an overlapping zone to at least a major part of a width in contact with the inner sheath or the outer envelope.

19. A pipe according to claim 1, wherein said at least one layer of a flexible, thin and flat metal band comprises a flexible, thin and flat metal band having a width of at least 1 cm and a thickness of from 1/100 mm to 5/10 mm.

* * * * *